United States Patent [19]
Becker

[11] Patent Number: 5,945,590
[45] Date of Patent: Aug. 31, 1999

[54] LOAD TESTING STAND FOR A HAND-HELD GRIP DYNAMOMETER

[76] Inventor: Theodore J. Becker, 5812 Chenault Beach Dr., Mukilteo, Wash. 98275

[21] Appl. No.: 09/124,990

[22] Filed: Jul. 30, 1998

[51] Int. Cl.[6] .................................................. G01L 25/00
[52] U.S. Cl. ............................................................. 73/1.13
[58] Field of Search .................................. 73/1.08, 1.13; 177/50

[56] References Cited

U.S. PATENT DOCUMENTS

| | | |
|---|---|---|
| 2,321,652 | 6/1943 | Carliss . |
| 3,585,840 | 6/1971 | Landsness . |
| 3,995,471 | 12/1976 | Konomi et al. . |
| 4,090,393 | 5/1978 | Kharitonov et al. . |
| 4,798,094 | 1/1989 | Newhall et al. . |

FOREIGN PATENT DOCUMENTS

| | | |
|---|---|---|
| 651222 | 3/1979 | U.S.S.R. . |
| 1645864 | 4/1991 | U.S.S.R. . |
| 1707492 | 1/1992 | U.S.S.R. . |

OTHER PUBLICATIONS

Flood–Joy, Maureen, Mathiowetz, Virgil, Grip–Strength Measurement: A Comparison of Three Jamar Dynamometers, 1995, pp. 235–243. (The Occupational Therapy Journal of Research 7:4).

Fess, Elaine Ewing, The need for reliability and validity in hand assessment instruments, Sep. 1986, pp. 621–623. (The Journal of Hand Surgery, vol. 11A, No. 5).

Radwin, R.G., A linear force–summing han dynamometer independent of point of application, Oct. 1991, pp. 339–340. (Applied Ergonomics 1991, 22.5).

Harkonen, Riita et al., Accuracy of the Jamar Dynamometer, Oct. 1993, 259–262. (Journal of Hand Therapy).

*Primary Examiner*—Robert Raevis
*Attorney, Agent, or Firm*—Richard C. Litman

[57] ABSTRACT

A load testing stand for a hand-held grip dynamometer having a base for securing a dynamometer and a top horizontal plate which seats a dual vertical plunger piston. Loads of various magnitudes are placed on the top plate to check or calibrate the accuracy of the dynamometer. A carrying strap may be attached to a bottom portion of the grip dynamometer for ease of carrying.

11 Claims, 5 Drawing Sheets

LOAD TESTING STAND FOR A HAND-HELD GRIP DYNAMOMETER

BACKGROUND OF THE INVENTION

1. Field of the Invention

The present invention relates generally to a force-measuring apparatus and, more specifically, to a load-testing stand for calibrating hand-held grip dynamometers.

2. Description of the Related Art

Various hand dynamometers have been devised for determining the effects or application of loads in impact studies and medical applications over the past few years. One of the most important problems of the conventional dynamometers is that a dynamometer which is lightweight and easy to move from various places is almost impossible to find. Also, in 1994 and 1995, the American Medical Association adopted a formula for hand injury percentage of impairment using a hand-held grip dynamometer.

However, there is as yet no way to verify the accuracy of the determination of impairment, because quantifying the grip device is questionable with respect to its accuracy. The quantification of the hand-held grip dynamometer has not as yet been considered on an annual basis or on a post purchase basis for evaluating the accuracy of the grip device, because no portable, stand-alone grip device has been established as a professional standard. Once the device has left the manufacturing facility, it is presumed by industry, government agencies and small business consumers that necessary calibrations have been accurately determined and that existing dynamometers in the field will give corresponding comparative results. However, testing by an independent source such as a local Government Department of Weights and Measures is advised that no stationary position device has been available to permit a user to independently verify the accuracy of conventional dynamometers through a load bearing test as described herein.

U.S. Pat. No. 2,321,652 issued to Carliss discloses a dynamometer which resembles an old fashion weighing machine. Weights or forces are determined by a mechanical weighing scale which is interconnected to an analog lever arm by a spring loaded mechanical linkage for indicating a force reading via a graduated scale. The mechanical linkage is quite involve including a series of gears for transmitting various applied forces. The dynamometer according to the instant invention is completely different from the device taught by Carliss. In this regard, there is no requirement for mechanical linkages having complex gear systems nor is there a need for a mechanical weighing scale as taught therein.

U.S. Pat. No. 3,585,840 discloses a force generator which generates a force of constant amplitude and changing direction for calibrating force-sensing instruments. A resilient rod with a bearing surface provide on the free end of the rod is anchored to the instrument to be calibrated in a cantilevered arrangement. The difficulty with this particular design feature is the load capacity is limited due to moments generated by the applied force and exerted on the rod. Beyond a critical applied force failure cold occur in the rod in the form of fracture, bending, etc. The dynamometer according to the instant invention does not use the cantilevered principle, and subsequently is not prone to failure as a result of bending moments recited above.

U.S. Pat. No. 3,995,471 issued to Konomi et al. discloses a device for calibrating a chassis dynamometer comprising a drive wheel for driving rollers of the dynamometer. The drive wheel is carried by a frame via a spring, a fluid pressure operated jack which selectively lifts the drive wheel to disengage it for rollers. The device taught by Konomi et al. is entirely different to the instant invention in that there is no need for an actuating means for lifting driving rollers.

U.S. Pat. No. 4,090,393 issued to Kharitonov et al. discloses a method and apparatus for calibrating a dynamometer wherein a force of gradual magnitudes are applied to two separate cross beams. A checking or calibrating cross beam houses a weight which is compared to a master cross beam upon which forces of gradual magnitudes are placed for calibration. There are significant structural differences in this device and the dynamometer according to the invention. The dynamometer according to the instant invention does not require dual dynamometers to make calibrations. Secondly, the dynamometer according to the instant invention is readily adapted for easy assembly and disassembly which significantly reduces carrying weight during transport.

The Soviet Union Patent No. 1645864 issued to Ostrvnoi discloses a dynamometer which uses a similar calibration technique to that of Kharitonov et al. (See also SU 651222).

Other U.S. and Foreign patents of general relevance to the dynamometer according to the instant invention are U.S. Pat. No. 4,798,094 issued to Newhall et al. and Russian Pat. (SU 1707492). Newhall et al. in particular disclose an apparatus having hydrostatic bearings which provide centering of a piston and alignment of the piston-to-cylinder interface. The Russian patent discloses a device for static-dynamic calibration of dynamometers wherein forces within a specified frequency ranged are checked.

Other documents by Flood-Joy et al. (1985) Fess (1986), Radwin et al. (1991) and Riitta Harkonen (1993) are also of general relevance to the instant invention which suggests the need for a reliable dynamometer which yields valid measured data subsequent to calibration.

The hand-held dynamometer and assembly according to the instant invention is different from the prior and related art, in that it provides automatic calibration via load testing for a dynamometer with reduced material elements. This significantly improves portability of the device including an easy assembly and disassembly scheme as herein described.

None of the above inventions and patents, taken either singularly or in combination, is seen to describe the instant invention as claimed. Thus, a load testing stand for hand-held grip dynamometer solving the aforementioned problems is desired.

SUMMARY OF THE INVENTION

The load testing apparatus according to the invention has a base for securing a grip dynamometer and a top horizontal plate which seats a dual stem vertical plunger piston. Loads of various magnitudes are placed on the top plate to check or calibrate the accuracy of the dynamometer. A carrying strap is optionally attached to a bottom portion of the dynamometer for ease of carrying from various locations.

Accordingly, it is a principal object of the invention to provide a hand-held grip dynamometer and assembly which calibrates a dynamometer with reduce material and mechanical component requirements.

It is another object of the invention to provide a hand-held grip dynamometer and assembly which is simple to use and to disassemble for transport.

It is a further object of the invention to provide a hand-held grip dynamometer and assembly which reduces sources of errors associate with load testing.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a hand-held grip dynamometer and assembly which verifies the accuracy of readings via load bearing tests. The preferred embodiments of the present invention are depicted in FIGS. 1–5, and are generally referenced by numerals 6, 6a, 6b, 6c and 6d, respectively.

Figure 1:
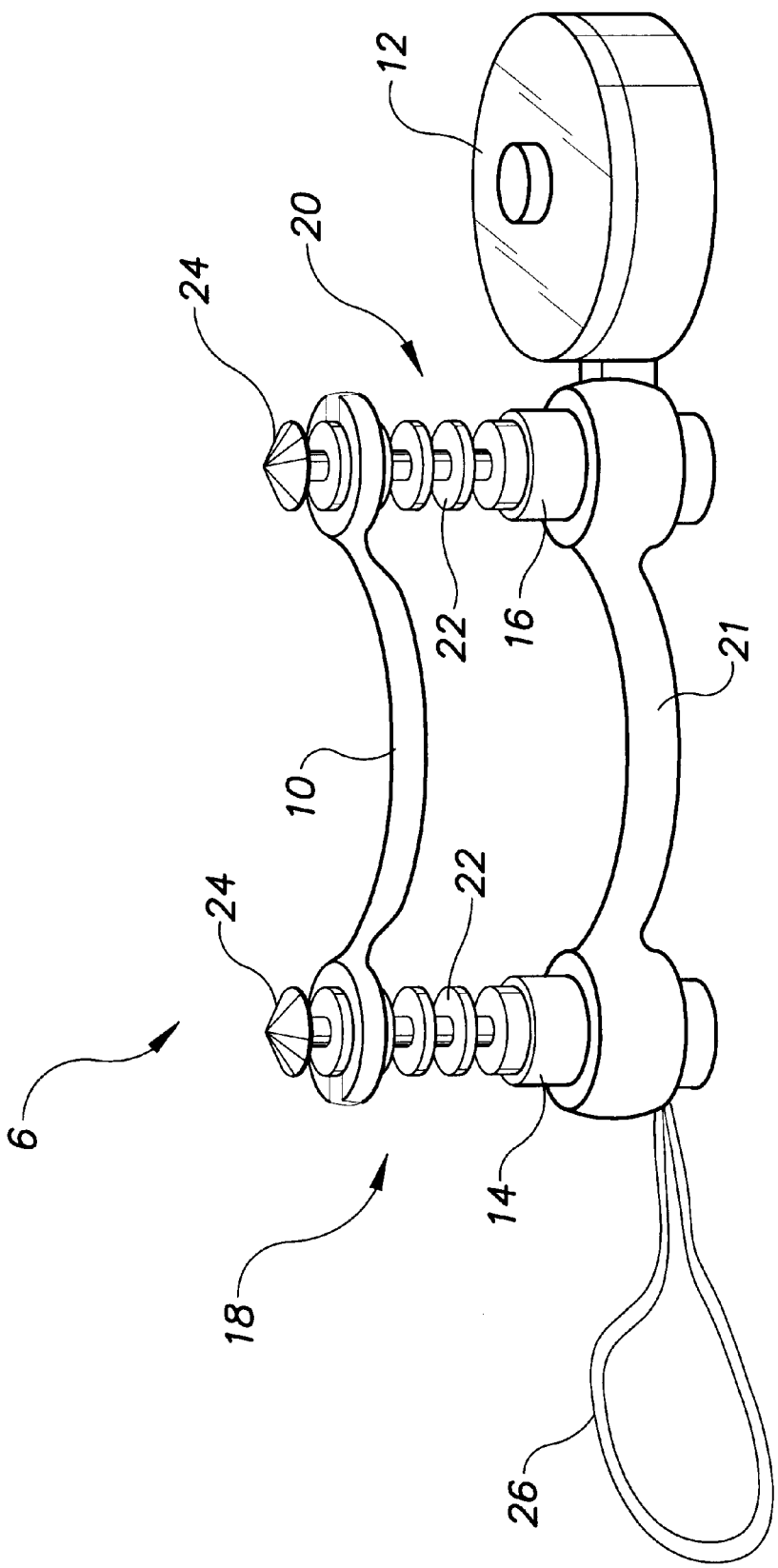
FIG. 1 is a perspective view of the hand-held grip dynamometer according to the present invention.

As best shown in FIG. 1, a hand-held grip dynamometer 6 is depicted comprising a handle 10, a gauge 12, dual pistons 14 and 16, and dual insertable prongs 18 and 20. In some grip dynamometers useful with, the invention, the readout means or gauge 12, is replaced by a force transducer wired to a readout, e.g., a numeric LED or LCD gauge, or a microprocessor with an LCD readout. The pistons 14 and 16 are plunger pistons which are seated vertically with respect to the prongs 18, 20 and are interconnected by a sealed hydraulic channel 21 which produces a pressure gradient upon receipt of an applied load 50 and is subsequently registered by the gauge 12. Each respective prong 18,20 has a plurality of concentric discs 22 which are disposed uniformly and equally spaced with respect to each adjacent disc 22 along a length dimension of each prong 18 and 20.

Figure 3:
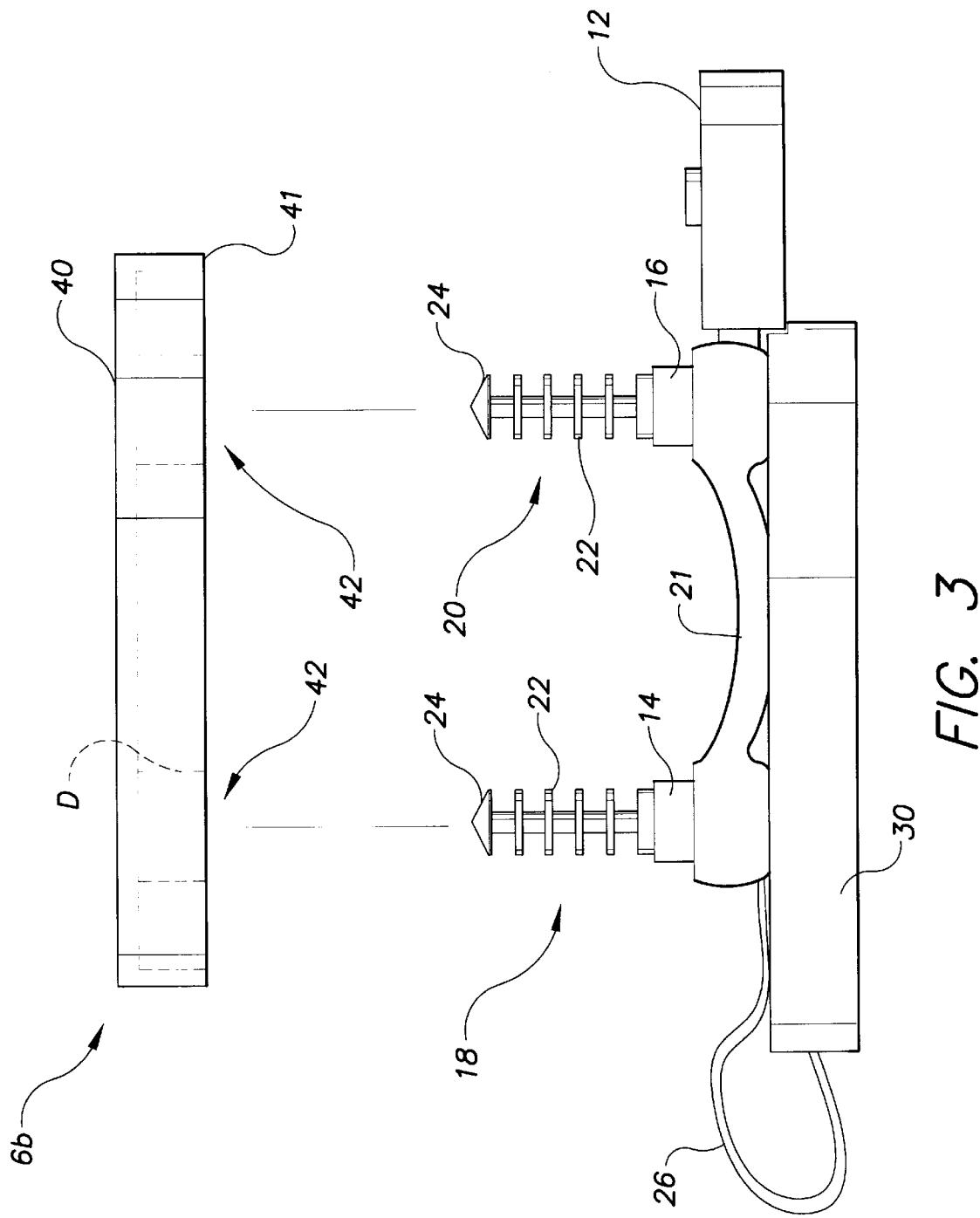
FIG. 3 is an exploded view of the hand-held grip dynamometer according to the invention, illustrating the attachment of a face plate.
Figure 4:
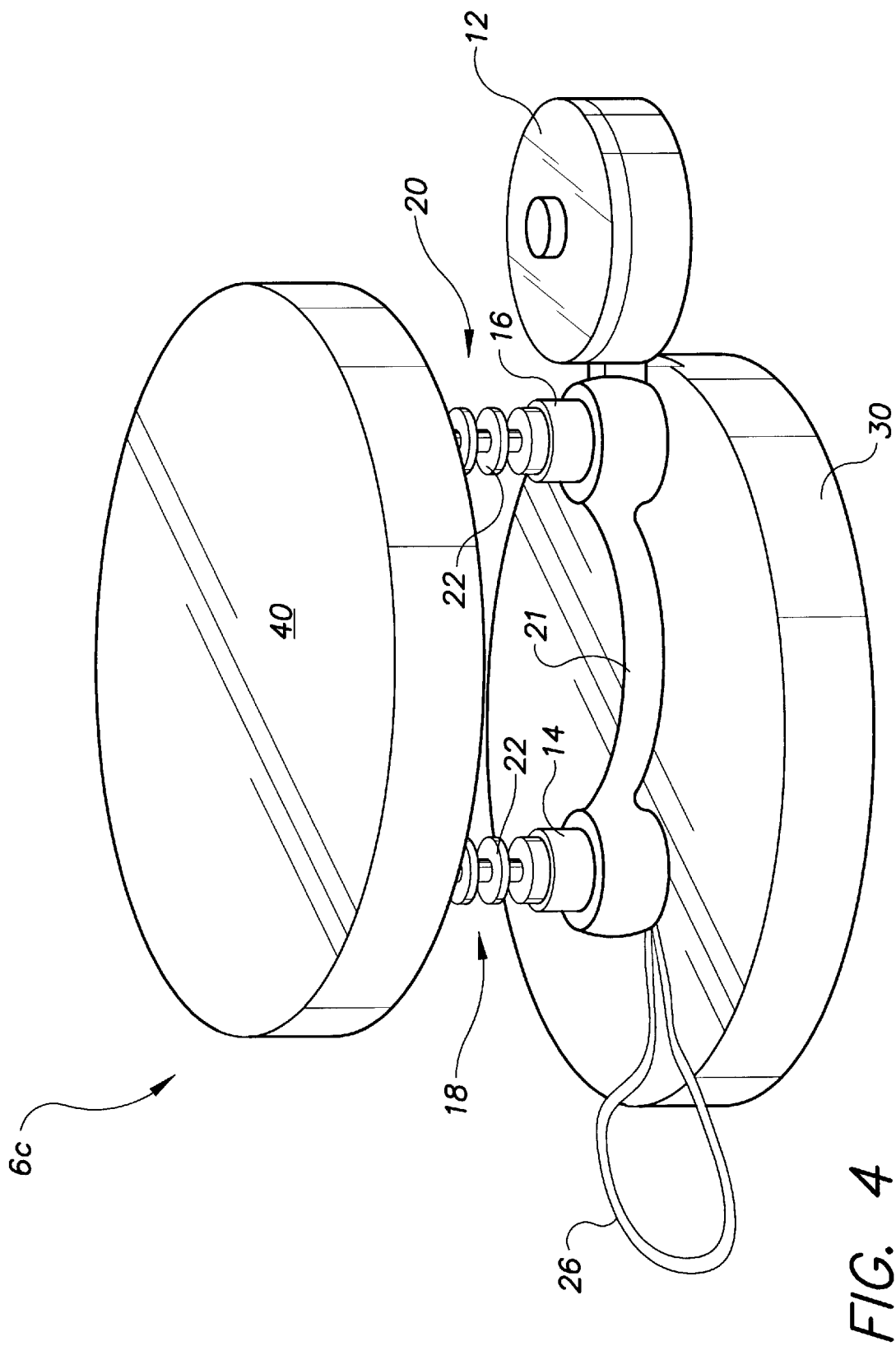
FIG. 4 is a perspective view of the hand-held grip dynamometer as an assembly according to the invention.
Figure 5:
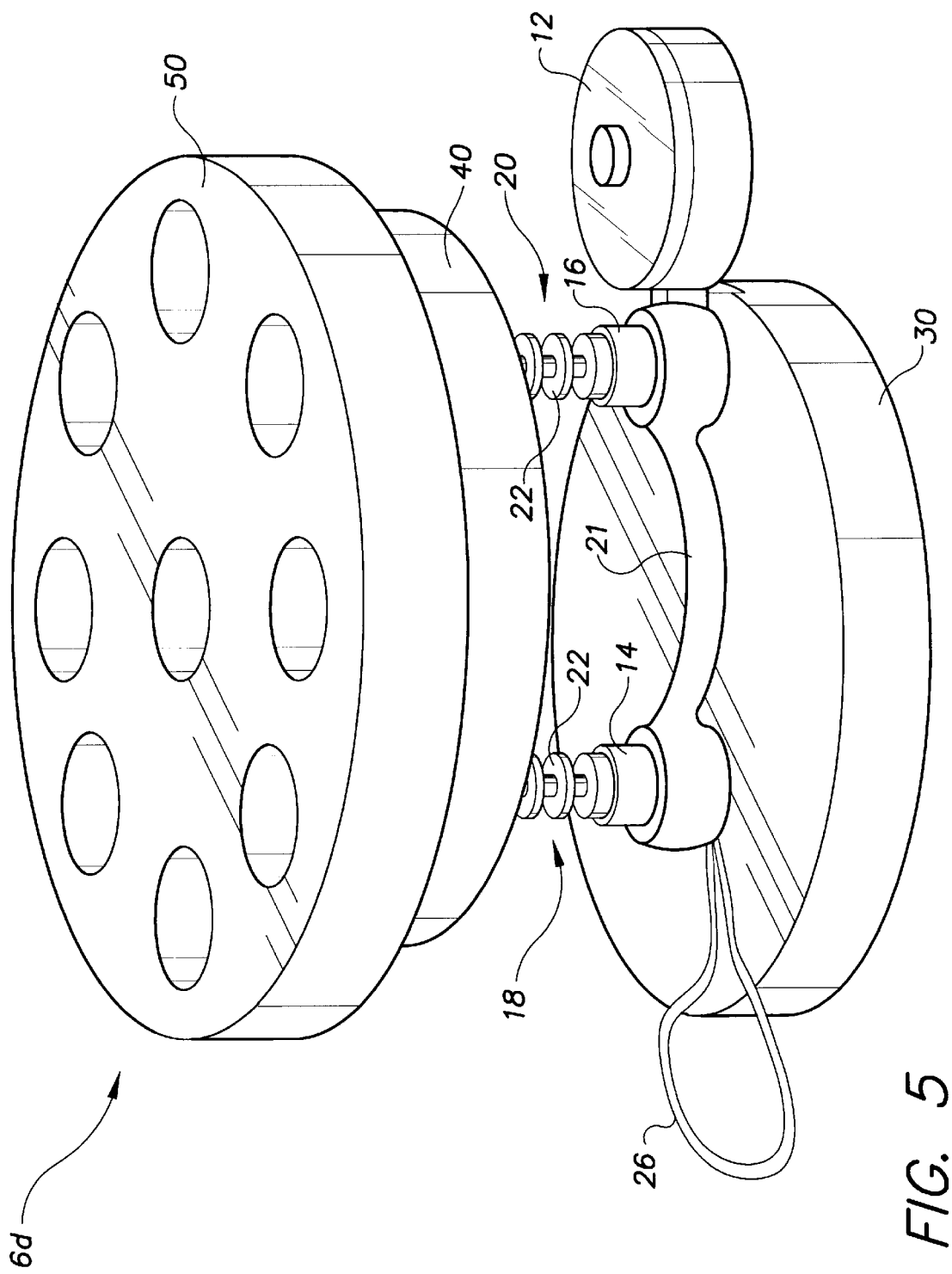
FIG. 5 is an environmental perspective view of the hand-held grip dynamometer according to FIG. 4, illustrating the application of a load for calibrating the grip dynamometer.

Each disc 22 provides a structural means for maintaining proper alignment with a top or face-plate 40 via a plurality of cylindrically shaped cavities 42 located at the base 41 of the top or face-plate 40 illustrated in FIG. 3. The prongs 18 and 20 further comprise substantially conically shaped tops or tips 24 for providing the proper balance or leveling of the top 40 during the initial alignment with each prong 18, 20. A strap 26 is fastened to the channel 21 which is ergonomically shaped to fit the contour of a users hand. The strap 26 is preferably made of nylon or an composite synthetic material. The particular advantages of this type of material is its weather resistant and quite durable under repeated use or cyclical stresses.

Figure 2:
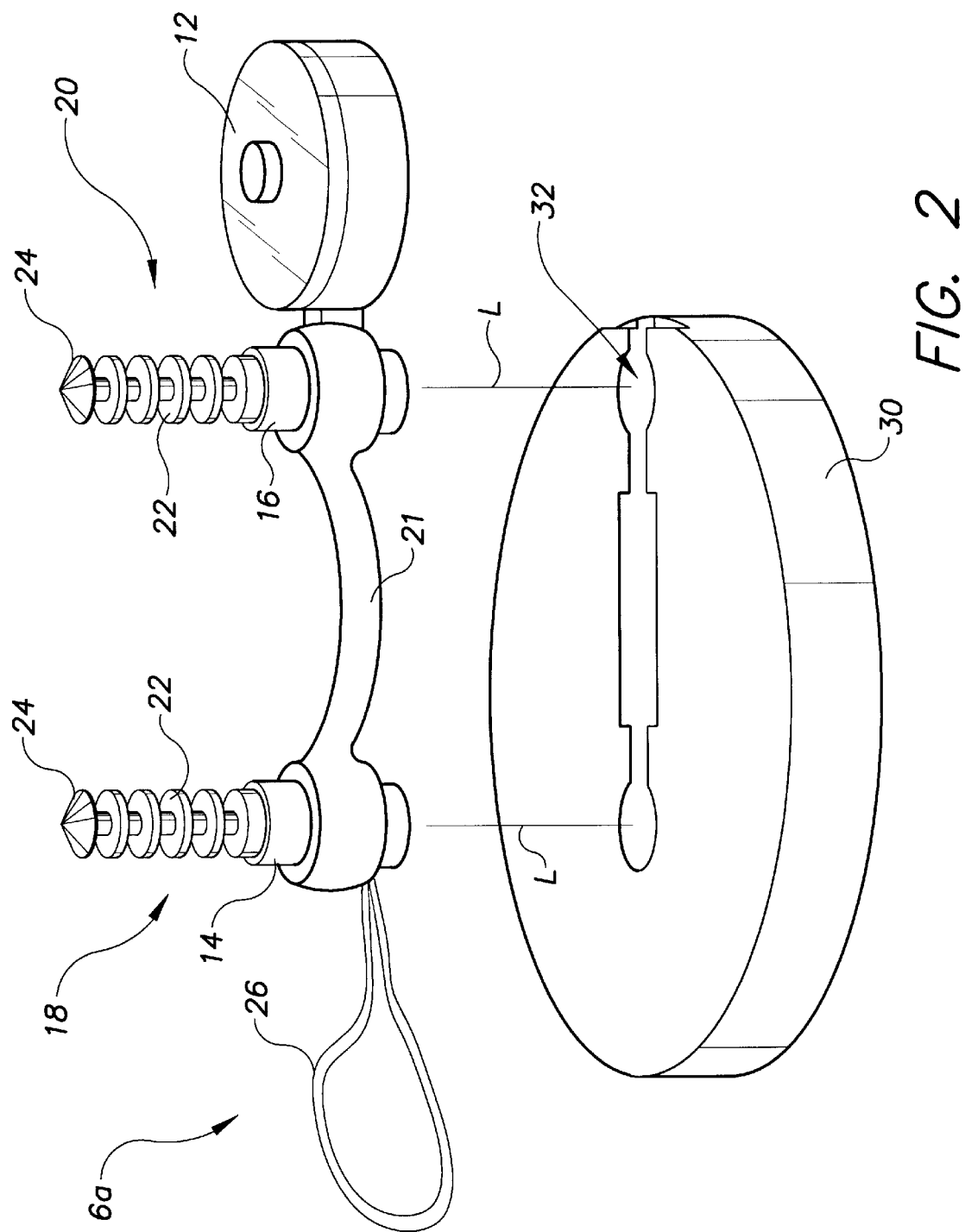
FIG. 2 is an exploded perspective view of the hand-held grip dynamometer according to the invention, illustrating its attachment to a base.

FIG. 2 shows an exploded view of the base 30 in combination with the grip dynamometer 6 and is generally referenced as numeral 6a. The base 30 comprises a recess 32 which made to fit the shape of the channel 21 of the grip dynamometer 6. The vertical lines L indicate the proper direction of seating the grip dynamometer within the recess 32 for easy assembly. After the grip dynamometer has been properly seated within the base 30, FIG. 3 diagrammatically illustrates in a similar exploded view the next step in properly seating the face-plate 40 onto the conical tips 24 of the respective prongs 18 and 20. The vertical lines L indicate alignment of the tips 24 with the cavities 42 formed within the base 41 of the face-plate 40 as indicated by dotted lines D. The complete load testing stand is diagrammatically illustrated in FIGS. 4 (6c) and 5 (6d) with an without the load 50, respectively. While physical dimensions and error tolerances have not been explicitly set forth, it would be obvious to one of ordinary skill in the art to size and calibrated the device according to the instant invention based on a particular tolerance depending upon the intended use of the measurements by the skilled artisan.

Other special features of the hand-held grip dynamometer and assembly 6c rest with the material and design features of each element of the invention. The base, top and grip dynamometer are preferably made of a metallic materials such as stainless steel, an alloy or similar material. While the top and base are shown as substantially cylindrical shaped elements, other shapes can be used.

It is to be understood that the present invention is not limited to the embodiments described above, but encompasses any and all embodiments within the scope of the following claims.

I claim:

1. A load testing stand for a hand-held grip dynamometer comprising:
   a base, a top and the grip dynamometer, said base further comprising a recess for inserting the grip dynamometer, the top having a bottom with a plurality of insertable cavities for attachment with the grip dynamometer, said dynamometer comprising a handle, a gauge, dual pistons and dual insertable prongs, said prongs having a plurality of concentric discs equally spaced from each other along a length dimension and said prongs further comprising substantially conically shaped tops.

2. The load testing stand for a hand-held grip dynamometer according to claim 1, wherein said base is made of a metallic material and has a substantially cylindrical shape.

3. The load testing stand for a hand-held grip dynamometer according to claim 1, wherein said top is made of a metallic material and has a substantially cylindrical shape.

4. The load testing stand for a hand-held grip dynamometer according to claim 1, wherein said handle is a removable handle and further comprises a strap for carrying.

5. The load testing stand for a hand-held grip dynamometer according to claim 1, wherein there is a single hydraulic channel interconnecting said dual pistons, said channel being shaped for mating with the contour of a users hand, said channel having the gauge mechanically fastened thereto.

6. The load testing stand for a hand-held grip dynamometer according to claim 5, wherein a strap is attached to the channel opposite the gauge.

7. The load testing stand for a hand-held grip dynamometer according to claim 6, wherein said strap is made of a composite synthetic material.

8. The load testing stand for a hand-held grip dynamometer according to claim 1, wherein said base, top and dynamometer are made of a metallic material.

9. The load testing stand for a hand-held grip dynamometer according to claim 8, wherein said metallic material is stainless steel.

10. The load testing stand for a hand-held grip dynamometer according to claim 8, wherein said metallic material is an alloy.

11. The load testing stand for a hand-held grip dynamometer according to claim 1, wherein the stand and grip dynamometer further comprise a load for calibrating the grip dynamometer.

* * * * *